United States Patent Office 3,420,823
Patented Jan. 7, 1969

3,420,823
DIBENZOTHIAZINES
Wilson Shaw Waring, Macclesfield, England, assignor to Imperial Chemical Industries Limited, London, England, a corporation of Great Britain
No Drawing. Filed Mar. 24, 1966, Ser. No. 537,007
Claims priority, application Great Britain, Apr. 13, 1965, 15,728/65; Oct. 27, 1965, 45,500/65
U.S. Cl. 260—243          9 Claims
Int. Cl. C07d 43/02

ABSTRACT OF THE DISCLOSURE

Dibenzothiazine derivatives which possess antidepressant activity and compositions containing the same. Representative of these derivatives is 6-β-diethylaminoethyl-6H-dibenzo[c,e][1,2]thiazine-5,5-dioxide.

---

This invention relates to new dibenzothiazine derivatives which are able to reverse or prevent reserpine-induced hypothermia in mice, and which are therefore likely to be useful in the treatment of depression in man.

According to the invention we provide new dibenzothiazine derivatives of the formula:

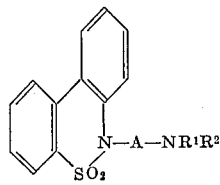

wherein A stands for a straight- or branched-chain alkylene residue, wherein $R^1$ and $R^2$, which may be the same or different, stand for hydrogen or for alkyl, hydroxyalkyl or alkenyl radicals, and wherein either or both of the benzene rings of the dibenzothiazine nucleus may optionally be further substituted by one or more radicals selected from halogen atoms and alkyl and trifluoromethyl radicals, and the salts thereof.

As a suitable value for the alkylene residue A there may be mentioned, for example, a straight- or branched-chain alkylene residue containing at least 2 and not more than 5 carbon atoms, for example the ethylene (—$CH_2CH_2$—), trimethylene (—$CH_2CH_2CH_2$—), propylene

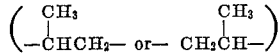

or tetramethylene (—$CH_2CH_2CH_2CH_2$—) residue.

As a suitable value for $R^1$ or $R^2$ when it stands for an alkyl or hydroxyalkyl radical there may be mentioned, for example, an alkyl or hydroxyalkyl radical of not more than 6 carbon atoms, for example the methyl, ethyl, propyl, isopropyl, butyl or β-hydroxyethyl radical.

As a suitable value for $R^1$ or $R^2$ when it stands for an alkenyl radical there may be mentioned, for example, an alkenyl radical of not more than 6 carbon atoms, for example the allyl radical.

As suitable optional substituents in either or both benzene rings of the dibenzothiazine nucleus there may be mentioned, for example, one or more substituents selected from fluorine, chlorine and bromine atoms, trifluoromethyl radicals and alkyl radicals of not more than 4 carbon atoms, for example methyl radicals.

As suitable salts of the dibenzothiazine derivatives of the invention there may be mentioned, for example, acid-addition salts derived from inorganic acids, for example hydrochlorides, hydrobromides, sulphates or phosphates, or acid-addition salts derived from organic acids, for example acetates, oxalates, tartrates, citrates, benzoates maleates or salicylates, or quaternary ammonium salts, for example alkyl halide or alkyl sulphate addition salts, for example methiodides or methosulphates.

Particular dibenzothiazine derivatives of the invention are, for example,

6-β-diethylaminoethyl-6H-dibenzo[c,e][1,2]thiazine-5,5-dioxide;
6-β-dimethylaminoethyl-6H-dibenzo[c,e][1,2]thiazine-5,5-dioxide;
6-γ-dimethylaminopropyl-6H-dibenzo-[c,e][1,2]thiazine-5,5-dioxide;
6-β-aminoethyl-6H-dibenzo[c,e][1,2]thiazine-5,5-dioxide;
7-chloro-6-β-diethylaminoethyl-6H-dibenzo[c,e][1,2]thiazine-5,5-dioxide;
2-chloro-6-γ-dimethylaminopropyl-6H-dibenzo[c,e][1,2]thiazine-5,5-dioxide;
6-β-di-isopropylaminoethyl-6H-dibenzo[c,e][1,2]thiazine-5,5-dioxide;
7-bromo-6-β-diethylaminoethyl-6H-dibenzo[c,e][1,2]thiazine-5,5-dioxide;
6-β-diethylaminoethyl-2-methyl-6H-dibenzo[c,e][1,2]thiazine-5,5-dioxide;
6-β-dimethylaminopropyl-6H-dibenzo[c,e][1,2]thiazine-5,5-dioxide;
6-β-ethylaminoethyl-6H-dibenzo[c,e][1,2]thiazine-5,5-dioxide;
6-β-methylaminoethyl-6H-dibenzo[c,e][1,2]thiazine-5,5-dioxide;
6-β-(N-β-hydroxyethyl-N-methylamino)ethyl-6H-dibenzo[c,e][1,2]-thiazine-5,5-dioxide;
6-β-n-butylaminoethyl-6H-dibenzo[c,e][1,2]thiazine-5,5-dioxide;
6-γ-methylaminopropyl-6H-dibenzo[c,e][1,2]thiazine-5,5-dioxide;
6-(4-dimethylaminobutyl)-6H-dibenzo[c,e][1,2]thiazine-5,5-dioxide;
6-β-isopropylaminoethyl-6H-dibenzo[c,e][1,2]thiazine-5,5-dioxide;
6-β-n-propylaminoethyl-6H-dibenzo[c,e][1,2]thiazine-5,5-dioxide;
6-β-allylaminoethyl-6H-dibenzo[c,e][1,2]thiazine-5,5-dioxide and
6-β-diethylaminoethyl-7-trifluoromethyl-6H-dibenzo-[c,e][1,2]thiazine-5,5-dioxide, and the acid-addition salts thereof, and 6-β-dimethylaminoethyl-6H-dibenzo[c,e][1,2]thiazine-5,5-dioxide methiodide, and of these, preferred compounds are 6-β-diethylaminoethyl-6H-dibenzo[c,e][1,2]thiazine-5,5-dioxide;
6-β-dimethylaminoethyl-6H-dibenzo[c,e][1,2]thiazine-5,5-doxide;
6-γ-dimethylaminopropyl-6H-dibenzo[c,e][1,2]thiazine-5,5-dioxde;
6-β-aminoethyl-6H-dibenzo-[c,e][1,2]thiazine-5,5-dioxde;
6-β-dimethylaminopropyl-6H-dibenzo[c,e][1,2]thiazine-5,5-dioxide and
6-β-ethylaminoethyl-6H-dibenzo[c,e][1,2]thiazine-5,5-dioxide and the salts thereof.

According to a further feature of the invention we provide a process for the manufacture of the new dibenzothiazine derivatives of the invention which comprises the interaction of a compound of the formula:

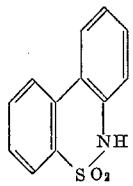

wherein either or both of the benzene rings of the dibenzothiazine nucleus may optionally be further substituted as stated above, or a salt thereof, with a compound of the formula:

X—A—NR¹R² wherein A, R¹ and R² have the meanings stated above and wherein X stands for a halogen atom, or an acid-addition salt thereof.

As a suitable value for X there may be mentioned, for example, the chlorine, bromine or iodine atom.

As a suitable salt of the dibenzothiazine starting material there may be mentioned, for example, a metal salt, for example an alkali metal salt, for example the sodium salt.

The said interaction may be carried out in an inert diluent or solvent, for example ethanol or benzene or a mixture thereof, or dimethylformamide, and it may be accelerated or completed by the application of heat. The interaction is conveniently carried out in the presence of an acid-binding agent, which preferably forms a salt with the dibenzothiazine starting material.

It is to be understood that where, in the above process, the substituent —X and the substituent —NR¹R² are attached to adjacent carbon atoms of the alkylene residue A, then during the reaction the position of the substituent —NR¹R² with respect to the alkylene residue A may be changed. It is surmised that this rearrangement may take place because under the conditions of the reaction the starting material having the partial structure:

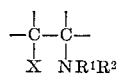

may be rearranged to an alkyleneiminium derivative having the partial structure:

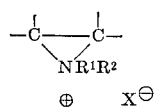

and that this last-mentioned derivative may react with the dibenzothiazine starting material so that the substituent —NR¹R² is attached to either of the adjacent carbon atoms.

The dibenzothiazine starting material may be obtained from a sulphonamido derivative of the formula:

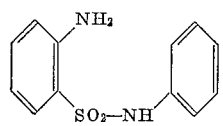

wherein either or both of the benzene rings may optionally be further substituted as stated above, in a similar manner to that described hereinafter for the manufacture of the new dibenzothiazine derivatives.

According to a further feature of the invention we provide a process for the manufacture of the new dibenzothiazine derivatives of the invention which comprises the interaction of a compound of the formula:

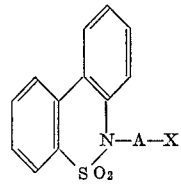

wherein A and X have the meanings stated above, and wherein either or both of the benzene rings may optionally be further substituted as stated above, with an amine of the formula NHR¹R², wherein R¹ and R² have the meanings stated above.

The said interaction may be carried out in an inert diluent or solvent, for example ethanol, dimethylformamide, aqueous ethanol or aqueous dimethylformamide, and it may be accelerated or completed by the application of heat.

The starting material for the last-mentioned reaction may be obtained by the interaction of a compound of the formula:

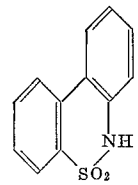

wherein either or both of the benzene rings may optionally be further substituted as stated above, or a salt thereof, with a compound of the formula:

X—A—X¹ wherein X and A have the meanings stated above and wherein X¹ stands for a halogen atom.

As a suitable value for X¹ there may be mentioned, for example, the chloride, bromine or iodine atom. It is to be understood that X¹ may be the same as, or different from, X.

According to a further feature of the invention we provide a process for the manufacture of those of the new dibenzothiazine derivatives of the invention wherein R¹ and R² both stand for hydrogen which comprises the removal of the protecting group from a compound of the formula:

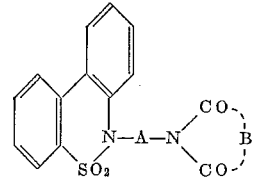

wherein A has the meaning stated above, wherein either or both of the benzene rings may optionally be further substituted as stated above, and wherein B stands for a hydrocarbon radical, the group —CO . . . B . . . CO— forming the said protecting group.

As a suitable value for B there may be mentioned, for example, an alkylene, alkenylene or arylene radical, for example the ethylene (—CH₂CH₂—), vinylene (CH=CH—)

or 1,2-phenylene radical. Thus, suitable values for the group

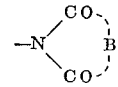

are, for example, the succinimido, maleimido or phthalimido groups.

The said protecting group may be removed by hydrolytic means, for example by hydrolysis with an alkali, for example by hydrolysis with an aqueous or aqueous alcoholic solution of sodium hydroxide or potassium hydroxide, or by hydrolysis with a strong acid, for example hydrobromic acid, in a diluent or solvent, for example acetic acid. Alternatively, when the group B stands for the 1,2-phenylene radical, the protecting group may be removed by the action of hydrazine, for example in the form of hydrazine hydrate, in an inert diluent or solvent, for example methanol or ethanol, followed by treatment with a dilute mineral acid, for example dilute hydrochloric acid.

Any of the above-mentioned processes for the removal of protecting groups may be accelerated or completed by the application of heat.

The starting material for the last-mentioned process may be obtained by the interaction of a compound of the formula:

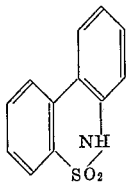

wherein either or both of the benzene rings may optionally be further substituted as stated above, or a salt thereof, for example the sodium salt thereof, with a compound of the formula:

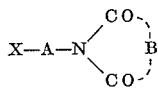

wherein X, A and B have the meanings stated above, or by the interaction of a compound of the formula:

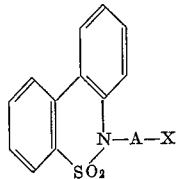

wherein A and X have the meanings stated above, and wherein either or both of the benzene rings may optionally be further substituted as stated above, with a compound of the formula:

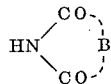

wherein B has the meaning stated above, or a salt thereof, for example the sodium or potassium salt thereof.

According to a further feature of the invention we provide a process for the manufacture of the new dibenzothiazine derivatives of the invention which comprises the diazotisation of a sulphonamido derivative of the formula:

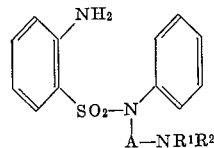

wherein A, $R^1$ and $R^2$ have the meanings stated above and wherein either or both of the benzene rings may optionally be further substituted as stated above, and the subsequent conversion of the diazo-compound thus formed into the dibenzothiazine derivative by heating.

It is to be understood that the diazo-compound may be converted into the dibenzothiazine derivative directly, or that there may first be formed a salt derived from the triazine cation of the formula:

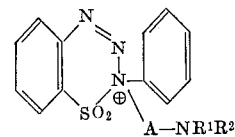

wherein A, $R^1$ and $R^2$ have the meanings stated above and wherein either or both of the benzene rings may optionally be further substituted as stated above, and the said salt is thereafter converted into the dibenzothiazine derivative by heating.

The diazotisation may be carried out in aqueous solution by use of an alkali metal nitrite, for example sodium nitrite, and an acid, for example hydrochloric acid or a mixture of hydrochloric acid and acetic acid. The diazotisation is preferably carried out at a temperature of between —10° and +20° C.

The diazo-compound may be heated in the aqueous acidic solution alone or it may be heated in the presence of a catalyst, for example copper powder, optionally in an alkaline medium, for example in aqueous sodium hydroxide solution, or in a buffered medium, for example in aqueous sodium acetate solution.

The starting material for the last-mentioned process for the manufacture of new dibenzothiazine derivatives may be obtained by the interaction of a compound of the formula:

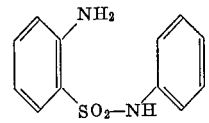

wherein either or both of the benzene rings may optionally be further substituted as stated above, with a compound of the formula:

X—A—$NR^1R^2$ wherein X, A, $R^1$ and $R^2$ have the meanings stated above.

According to yet a further feature of the invention we provide a process for the manufacture of the new dibenzothiazine derivatives of the invention which comprises the diazotisation of a sulphonamido derivative of the formula:

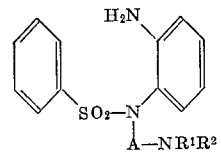

wherein A, $R^1$ and $R^2$ have the meanings stated above and wherein either or both of the benzene rings may optionally be further substituted as stated above, and the subsequent conversion of the diazo-compound thus formed into the dibenzothiazine derivative by heating.

The diazotisation may be carried out in aqueous solution by use of an alkali metal nitrite, for example sodium nitrite, and an acid, for example hydrochloric acid or a mixture of hydrochloric acid and acetic acid. The diazotisation is preferably carried out at a temperature of between —10° and +20° C.

The diazo-compound may be heated in the aqueous acidic solution alone or it may be heated in the presence of a catalyst, for example copper powder, optionally in an alkaline medium, for example in aqueous sodium hydroxide solution, or in a buffered medium, for example in aqueous sodium acetate solution.

The starting material for the last-mentioned process for the manufacture of new dibenzothiazine derivatives may be obtained by the interaction of an amino compound of the formula:

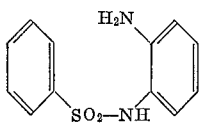

wherein either or both of the benzene rings may optionally be further substituted as stated above, with a compound of the formula:

X—A—NR¹R² wherein X, A, R¹ and R² have the meanings stated above.

According to a further feature of the invention we provide a process for the manufacture of those of the new dibenzothiazine derivatives of the invention wherein R¹ stands for hydrogen and wherein R² stands for an alkyl or hydroxyalkyl radical, which comprises the hydrogenolysis of a compound of the formula:

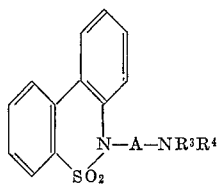

wherein A has the meaning stated above, wherein either or both of the benzene rings may optionally be further substituted as stated above, wherein R³ stands for an alkyl or hydroxyalkyl radical and wherein R⁴ stands for a hydrogenolysable radical.

As a suitable value for R⁴ there may be mentioned, for example, the benzyl radical, The hydrogenolysis may be carried out, for example, by hydrogen in the presence of a catalyst, for example a palladium on charcoal catalyst, in a diluent or solvent, for example dioxan, and it may be carried out at ambient temperature and at atmospheric pressure.

The starting material for the last-mentioned process may be obtained by the interaction of a compound of the formula:

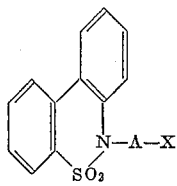

wherein A and X have the meanings stated above and wherein either or both of the benzene rings may optionally be further substituted as stated above, with an amine of the formula HNR³R⁴, wherein R³ and R⁴ have the meanings stated above.

According to a further feature of the invention we provide a process for the manufacture of those of the new dibenzothiazine derivatives of the invention wherein R¹ stands for hydrogen and wherein R² stands for an alkyl radical of the formula—CHR⁵R⁶, wherein R⁵ stands for hydrogen or for an alkyl radical and wherein R⁶ stands for an alkyl radical, which comprises the interaction of a dibenzothiazine derivative of the formula:

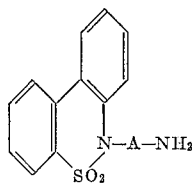

wherein A has the meaning stated above and wherein either or both of the benzene rings may optionally be further substituted as stated above, with a carbonyl compound of the formula R⁵COR⁶, wherein R⁵ and R⁶ have the meanings stated above, under reducing conditions.

The said reducing conditions may be, for example, hydrogen in the presence of a hydrogenation catalyst, for example platinum oxide, in a diluent or solvent which, in the case wherein R⁵ and R⁶ both stand for alkyl radicals, may with advantage be an excess of the carbonyl compound of the formula R⁵COR⁶. The said hydrogenation may be carried out at ambient temperature and at atmospheric pressure.

According to a further feature of the invention we provide a process for the manufacture of those of the new dibenzothiazine derivatives of the invention wherein R¹ and R² both stand for hydrogen which comprises the reduction of a cyano compound of the formula:

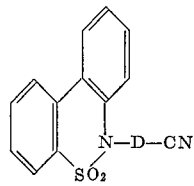

wherein D stands for a straight- or branched-chain alkylene residue such that —D—CH₂— has the same meaning as is stated above for A, and wherein either or both of the benzene rings may optionally be further substituted as stated above.

The reduction may be carried out, for example, by means of an alkali metal aluminum hydride, for example lithium aluminium hydride, in an inert diluent or solvent, for example tetrahydrofurane or dimethoxyethane. The reduction may be carried out at a reduced temperature, for example at a temperature between —30° and 0° C.

As stated above, the dibenzothiazine derivatives of the invention possess valuable anti-depressant properties, and some of them also inhibit the enzyme monoamine oxidase in biological systems.

According to a further feature of the invention, therefore, we provide new pharmaceutical compositions which comprise as active ingredient one or more dibenzothiazine derivatives of the formula:

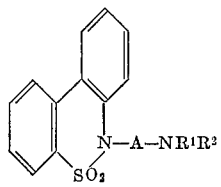

wherein A, R¹ and R² have the meanings stated above and wherein either or both of the benzene rings may optionally be further substituted as stated above, or a salt thereof, in association with a pharmaceutically-acceptable diluent or carrier therefor.

The pharmaceutical compositions of the invention may be in the form of tablets, capsules, aqueous or oily solutions or suspensions, emulsions, injectable aqueous or oily solutions or suspensions, or dispersible powders. It is expected that the compositions will be administered to man so that each man receives a total dose of between 50 mg. and 500 mg. of active ingredient per day, preferably in smaller doses given three times per day.

The invention is illustrated but not limited by the following examples in which the parts are by weight:

EXAMPLE 1

4 parts of 6H-dibenzo[c,e][1,2]thiazine-5,5-dioxide are dissolved in a solution of 0.44 part of sodium in 75 parts of ethanol, and to this solution is added 23 parts of a 10% solution of β-diethylaminoethyl chloride in benzene. The mixture is stirred and heated under reflux for 3 hours, cooled, filtered and the filtrate is evaporated to dryness under reduced pressure. The residue is washed with water, filtered, and the solid residue is dissolved in ether. The ethereal solution is dried over sodium sulphate, filtered, and the filtrate is treated with ethereal hydrogen chloride until precipitation of the hydrochloride is substantially complete. The ether is decanted, the hydrochloride is triturated with acetone and the mixture is filtered. The solid hydrochloride (M.P. 206–208° C.) is dissolved in warm water, and the base is liberated by the addition of aqueous ammonium hydroxide solution. The mixture is filtered, and the solid residue is crystallised from aqueous ethanol or petroleum ether (B.P. 60–80° C.) There is thus obtained 6-β-diethylaminoethyl-6H - dibenzo[c,e][1,2] - thiazine-5,5-dioxide, M.P. 79–80° C.

EXAMPLE 2

The process described in Example 1 is repeated except that the 23 parts of a 10% solution of β-diethylaminoethyl chloride in benzene are replaced by an equivalent amount of a solution of β-dimethylaminoethyl chloride in benzene. The mixture is stirred and heated under reflux for 3 hours, cooled, filtered, and the filtrate is evaporated to dryness under reduced pressure. The residue is washed with water, the aqueous mixture is filtered and the solid residue is crystallised from petroleum ether (B.P. 60–80° C.). There is thus obtained 6-β-dimethylaminoethyl-6 - H-dibenzo[c,e][1,2]thiazine - 5,5 - dioxide, M.P. 106–107° C.

The above process is repeated except that the β-dimethylaminoetheyl chloride is replaced by an equivalent amount of γ-dimethylaminopropyl chloride. There is thus obtained 6-γ-dimethylaminopropyl-6H-dibenzo[c,e][1,2]thiazine-5,5 dioxide, M.P. 97–98° C. (crystallised from petroleum ether, B.P. 60–80° C.).

EXAMPLE 3

A mixture of 20 parts of 6-β-phthalimidoethyl-6H-dibenzo-[c,e][1,2]thiazine-5,5-dioxide, 450 parts of ethanol and 6 parts of hydrazine hydrate is heated under reflux for 2 hours and then cooled, acidified with 20% aqueous hydrochloric acid and filtered. The filtrate is evaporated to dryness under reduced pressure, the residue is stirred with water and the mixture is made alkaline with aqueous sodium hydroxide solution. The mixture is extracted with ether and the ethereal extract is washed with water and dried over sodium sulphate. The mixture is filtered and the filtrate is treated with excess of an acetone solution of oxalic acid. The mixture is filtered and the solid oxalate is crystallised from water. There is thus obtained 6-β-aminoethyl-6H-dibenzo[c,e][1,2]thiazine - 5,5 - dioxide oxalate, M.P. 212–213° C. (with decomposition).

The above oxalate is treated with excess of 10% aqueous potassium hydroxide solution and the mixture is extracted with chloroform. The chloroform extract is washed with water, dried over sodium sulphate, and the solvent is removed by evaporation under reduced pressure. The solid residue is crystallised from a mixture of benzene and petroleum ether (B.P. 40–60° C.) and there is thus obtained 6-β-aminoethyl - 6H - dibenzo[c,e][1,2]thiazine-5,5-dioxide, M.P. 74–76° C.

The 6-β-phthalimidoethyl - 6H - dibenzo[c,e][1,2]thiazine-5,5-dioxide used as starting material in the above process may be obtained as follows:

1 part of a 50% dispersion of sodium hydride in oil is added to a stirred solution of 5 parts of 6H-dibenzo[c,e][1,2]thiazine-5,5-dioxide in 25 parts of dry dimethylformamide, and when reaction is complete a solution of 5 parts of N-2-bromoethylphthalimide in 15 parts of dry dimethylformamide is added and the mixture is stirred and heated at a temperature of 95–100° C. for 1 hour. The mixture is cooled, diluted with water and filtered and the solid product is crystallised from benzene. There is thus obtained 6-β-phthalimidoethyl - 6H - dibenzo[c,e][1,2]thiazine-5,5-dioxide, M.P. 176–177° C.

Alternatively the 6-β-phthalimidoethyl-6H-dibenzo[c,e][1,2]thiazine-5,5-dioxide used as starting material in the above process may be obtained as follows:

A mixture of 3,4 parts of 6-β-bromoethyl-6H-dibenzo[c,e][1,2]thiazine-5,5-dioxide, 1.9 parts of potassium phthalimide and 25 parts of dimethylformamide is heated under reflux for one hour using a bath kept at a temperature of 160° C. The mixture is cooled, diluted with water and filtered. The solid residue is crystallised from benzene, and there is thus obtained 6-β-phthalimidoethyl-6H-dibenzo[c,e][1,2]thiazine-5,5-dioxide, M.P. 176–177° C.

EXAMPLE 4

5 parts of 7-chloro-6H-dibenzo[c,e][1,2]thiazine-5,5-dioxide are dissolved in a solution of 0.9 part of sodium in 90 parts of ethanol, and to this solution is added 3.5 parts of β-diethylaminoethyl chloride hydrochloride. The mixture is stirred and heated under reflux for 4 hours, filtered hot, and the filtrate is evaporated to dryness under reduced pressure. The solid residue is crystallised from ethanol, and there is thus obtained 7-chloro-6-β-diethylaminoethyl-6H-dibenzo[c,e][1,2]thiazine - 5,5 - dioxide, M.P. 125–126° C.

The process described above is repeated except that the 7-chloro-6H-dibenzo[c,e][1,2]thiazine - 5,5 - dioxide is replaced by an equivalent amount of 2-chloro-6H-dibenzo[c,e][1,2]thiazine-5,5-dioxide and the β-diethylaminoethyl chloride hydrochloride is replaced by an equivalent amount of γ-dimethylaminopropyl chloride hydrochloride. There is thus obtained 2-chloro-6-(γ-dimethylaminopropyl)-6H-dibenzo[c,e][1,2]thiazine-5,5-dioxide, which is isolated by known means as the oxalate, M.P. 160–162° C. (with decomposition) (crystallised from ethanol).

The process described above is repeated except that the 7-chloro-6H-dibenzo[c,e][1,2]thiazine - 5,5 - dioxide is replaced by an equivalent amount of 6H-dibenzo[c,e][1,2]thiazine-5,5-dioxide and the β-diethylaminoethyl chloride hydrochloride is replaced by an equivalent amount of β-(di-isopropylamino)ethyl chloride hydrochloride. There is thus obtained 6-β-di-isopropylaminoethyl-6H-dibenzo[c,e][1,2]thiazine-5,5-dioxide, M.P. 101–102° C. (crystallised from petroleum ether B.P. 60–80° C.).

The 7-chloro-6H-dibenzo[c,e][1,2]thiazine-5,5-dioxide used as starting material in the above process may be prepared as follows:

A solution of 12 parts of o-aminobenzenesulphon-o-chloroanilide (M.P. 87–89° C., known from J. Org. Chem. (1951), 16, 815) in 100 parts of ethanol is mixed with a solution of 2.8 parts of sodium nitrite in 28 parts of water, and the mixture is added gradually to a stirred mixture of 16 parts of concentrated hydrochloric acid and 8 parts of water, the temperature being kept at 0–5° C. The mixture is stirred while 20 parts of sodium acetate are added and is then fitlered. The solid residue is added to a suspension of 1 part of copper powder in a solution of 5 parts of sodium hydroxide in 160 parts of water. The mixture is stirred and heated until no more nitrogen is evolved and an azo-dye is no longer obtained when a sample of the liquid is treated with an alkaline solution of β-naphthol. The mixture is treated with charcoal, filtered hot, and the filtrate is cooled and treated with glacial acetic acid until precipitation of solid is complete. The mixture is filtered and the solid product is washed with benzene and crystallised from ethanol. There is thus obtained 7-chloro-6H-dibenzo[c,e][1,2]thiazine-5,5-dioxide, M.P. 184–185° C.

In a similar manner, 2-chloro-6H-dibenzo[c,e][1,2]thiazine-5,5-dioxide, M.P. 203–204° C. (crystallised from isopropanol) may be obtained from 2-amino-4-chlorobenzenesulphonanilide, M.P. 142–143° C. (crystallised from aqueous ethanol) which in turn may be obtained from 4-chloro-2-nitrobenzenesulphonanilide, M.P. 126–127° C. (crystallised from isopropanol) by the method described in the following Example 5 for the preparation of o-aminobenzenesulphon-o-bromoanilide. 4-chloro-2-nitrobenzenesulphonanilide is known from Monatshefte (1928), 50, 266.

EXAMPLE 5

1.4 parts of a 50% dispersion of sodium hydride in oil are added gradually to a stirred solution of 3.1 parts of 7-bromo-6H-dibenzo[c,e][1,2]thiazine-5,5-dioxide in 20 parts of dry dimethylformamide, the temperature being kept below 15° C. 3.4 parts of β-diethylaminoethyl chloride hydrochloride are added and the mixture is stirred for 30 minutes at ambient temperature and is then heated for 2 hours at a temperature of 95–100° C. The mixture is cooled and filtered, the filtrate is concentrated by evaporation under reduced pressure and the residue is stirred with water. The mixture is filtered and the solid residue is washed with water, dried and crystallised from petroleum ether (B.P. 100–120° C.). There is thus obtained 7-bromo-6-β-diethylaminoethyl-6H-dibenzo[c,e][1,2]thizaine - 5,5-dioxide, M.P. 126–127° C.

The process described above is repeated except that the 7-bromo-6H-dibenzo[c,e][1,2]thiazine-5,5-dioxide is replaced by an equivalent amount of 2-methyl-6H-dibenzo [c,e][1,2]thiazine-5,5-dioxide. There is thus obtained 6-(β-diethylaminoethyl)-2-methyl - 6H - dibenzo[c,e][1,2] thiazine-5,5-dioxide, M.P. 90–91° C. (crystallised from petroleum ether B.P. 60–80° C.).

The 7-bromo-6H-dibenzo[c,e][1,2]thiazine-5,5-dioxide M.P. 184–185° C. (crystallised from isopropanol) used as starting material in the above process may be prepared in a similar manner to that described in Example 4 for the preparation of 7-chloro-6H-dibenzo[c,e][1,2]thiazine-5,5-dioxide, except that o-aminobenzenesulphon-o-bromoanilide is used in place of o-aminobenzenesulphon-o-chloroanilide.

The o-aminobenzenesulphon-o-bromoanilide used as intermediate in the above process may be obtained as follows:

44 parts of o-nitrobenzenesulphonyl chloride are added gradually to a stirred mixture of 85 parts of o-bromoaniline and 20 parts of dimethylformamide, and the temperature is allowed to rise to 80° C. The mixture is heated at 100° C. for one hour, cooled, stirred and acidified with 20% aqueous hydrochloric acid. The mixture is filtered and the solid residue is washed with water and crystallised from ethanol. There is thus obtained o-nitrobenzenesulphon-o-bromoanilide, M.P. 146–148° C.

16 parts of iron powder are added to a solution of 16 parts of o-nitrobenzenesulphon-o-bromoanilide in 150 parts of ethanol, and the mixture is stirred and heated under reflux while 100 parts of aqueous 0.5 N-hydrochloric acid are added gradually over 1 hour. The mixture is filtered hot, the filtrate is cooled and extracted with ether, and the ethereal solution is evaporated to dryness. The solid residue is crystallised from aqueous ethanol and there is thus obtained o-aminobenzenesulphon-o-bromoanilide, M.P. 88–89° C.

Similarly 2 - methyl-6H-dibenzo[c,e][1,2]thiazine-5,5-dioxide, M.P. 202–203° C. (crystallised from isopropanol) may be obtained from 2-amino-4-methylbenzenesulphonanilide, M.P. 102–103° C. (crystallised from aqueous ethanol) which in turn may be obtained from 4-methyl-2-nitrobenzenesulphonanilide, M.P. 126–128° C. which is known from Ann. (1914), 406, 135.

EXAMPLE 6

5 parts of 6H-dibenzo[c,e][1,2]thiazine-5,5-dioxide are dissolved in a solution of sodium ethoxide prepared by dissolving 1 part of sodium in 100 parts of ethanol. 3.8 parts of 1-dimethylamino-2-chloropropane hydrochloride are added and the mixture is heated under reflux for 4 hours. The mixture is cooled and filtered, the filtrate is evaporated to dryness under reduced pressure and the residue is crystallised from isopropanol. There is thus obtained 6 - β - dimethylaminopropyl-6H-dibenzo[c,e][1,2] thiazine-5,5-dioxide, M.P. 129–130° C. A rearrangement of the side chain takes place during the reaction, and the structure of the product is confirmed by proton magnetic resonance spectroscopy.

EXAMPLE 7

A mixture of 5 parts of 6-β-bromoethyl-6H-dibenzo [c,e][1,2]-thiazine-5,5-dioxide, 20 parts of dimethylformamide and 20 parts of a 70% solution of ethylamine in water is heated under reflux for 18 hours. The unreacted ethylamine and dimethylformamide are removed by evaporation under reduced pressure and the residue is stirred with water and acidified with 20% aqueous hydrochloric acid. The mixture is extracted with ether and the aqueous acidic layer is separated and made alkaline with aqueous ammonium hydroxide solution (density 0.88). The mixture is extracted with ether and the ethereal extract is washed with water and dried over sodium sulphate. The extract is treated with an ethereal solution of hydrogen chloride until precipitation is complete, and the precipitated gum is stirred with acetone until it becomes solid. The mixture is filtered, and the solid residue is crystallised from ethanol. There is thus obtained 6-β-ethylaminoethyl-6H - dibenzo[c,e][1,2]thiazine-5,5-dioxide hydrochloride, M.P. 198–199° C.

The 6-β-bromoethyl-6H-dibenzo[c,e][1,2]thiazine-5,5-dioxide used as starting material in the above process may be obtained as follows:

18.4 parts of 6H-dibenzo[c,e][1,2]thiazine-5,5-dioxide are dissolved in a solution of sodium ethoxide prepared by dissolving 1.84 parts of sodium in 200 parts of ethanol. 36 parts of 1,2-dibromoethane are added, and the mixture is stirred and heated under reflux for 24 hours. The mixture is cooled, filtered, and the filtrate is evaporated to dryness under reduced pressure. The residue is treated with water, filtered, and the solid residue is crystallised from ethanol. There is thus obtained 6-β-bromoethyl-6H-dibenzo[c,e][1,2]thiazine-5,5-dioxide, M.P. 1905–106° C.

EXAMPLE 8

The process described in Example 7 is repeated except that the aqueous ethylamine solution is replaced by an equivalent amount of a 40% solution of methylamine in water. The product is isolated as described in Example 7, except that the ethereal hydrogen chloride solution is replaced by ethereal oxalic acid solution, and there is thus obtained 6 - β - methylaminoethyl-6H-dibenzo[c,e] [1,2]thiazine-5,5-dioxide oxalate, M.P. 210–211° C. (crystallised from water).

EXAMPLE 9

The process described in Example 7 is repeated except that the 20 parts of dimethylformamide are replaced by 100 parts of ethanol. After the mixture has been heated under reflux, the solvent is removed by evaporation under reduced pressure, the residue is dissolved in ether, the ethereal solution is filtered, and the filtrate is treated with ethereal hydrogen chloride solution. There is thus obtained 6-β-ethylaminoethyl-6H-dibenzo[c,e][1,2]thiazine-5,5-dioxide hydrochloride, M.P. 198–199° C. (crystallised from ethanol).

The above process is repeated except that the ethylamine is replaced by an equivalent amount of β-methylaminoethanol and the product is isolated as described in Example 8. There is thus obtained 6-β-(N-β-hydroxyethyl-N - methylamino)ethyl-6H-dibenzo[c,e][1,2]thiazine-5,5-dioxide oxalate, M.P. 170° C. (with decomposition) (crystallised from methanol).

EXAMPLE 10

The process described in Example 7 is repeated except that the ethylamine is replaced by an equivalent amount of n-butylamine, and there is thus obtained 6-β-n-butyl-aminoethyl-6H-dibenzo[c,e][1,2]thiazine-5,5-dioxide hydrochloride, M.P. 194–196° C. (crystallised from methanol).

EXAMPLE 11

A mixture of 9.6 parts of 6-(γ-bromopropyl)-6H-dibenzo[c,e][1,2]thiazine-5,5-dioxide, 40 parts of dimethylformamide and 40 parts of a 40% solution of methylamine in water is heated under reflux for 18 hours. The product is isolated as described in Example 8. There is thus obtained [6-γ-methylaminopropyl-6-H-dibenzo[c,e][1,2]thiazine-5,5-dioxide oxalate, M.P. 202–203° C. (with decomposition) (crystallised from water).

The 6-(γ-bromopropyl)-6H-dibenzo[c,e][1,2]thiazine-5,5-dioxide used as starting material in the above process may be obtained by the process described in Example 7 for the preparation of 6-β-bromoethyl-6H-dibenzo[c,e][1,2]thiazine-5,5-dioxide, except that the 1,2-dibromoethane is replaced by an equivalent amount of 1,3-dibromopropane. There is thus obtained 6-(γ-bromopropyl)-6H-dibenzo[c,e][1,2]thiazine-5,5-dioxide, M.P. 86–87° C. (crystallised from ethanol).

EXAMPLE 12

A mixture of 3.2 parts of 6 - (4 - bromobutyl) - 6H-dibenzo[c,e][1,2]thiazine-5,5-dioxide, 20 parts of dimethylformamide and 20 parts of a 40% solution of dimethylamine in water is heated under reflux for 18 hours. The product is isolated as described in Example 8. There is thus obtained 6 - (4 - dimethylaminobutyl) - 6H - dibenzo[c,e][1,2]thiazine - 5,5 - dioxide oxalate, M.P. 151–152° C. (crystallised from ethanol).

The 6 - (4 - bromobutyl) - 6H - dibenzo[c,e][1,2]thiazine-5,5 - dioxide used as starting material in the above process may be obtained by the process described in Example 7 for the preparation of 6 - β - bromoethyl-6H-dibenzo[c,e][1,2]thiazine - 5,5-dioxide, except that the 1,2-dibromoethane is replaced by an equivalent amount of 1,4-dibromobutane. After the ethanol has been removed by evaporation the residue is steam distilled to remove excess 1,4-dibromobutane. The undistilled residue is cooled and extracted with ether and the ethereal extract is dried over sodium sulphate and evaporated to dryness. The residual oil is 6 - (4 - bromobutyl) - 6H - dibenzo[c,e][1,2]thiazine-5,5-dioxide.

EXAMPLE 13

A mixture of 1 part of 6 - β - dimethylaminoethyl - 6H-dibenzo[c,e][1,2]thiazine-5,5-dioxide, 1 part of methyl iodide and 150 parts of dry ether is left at ambient temperature for 18 hours. The mixture is filtered, and the solid residue is crystallised from methanol. There is thus obtained 6 - β - dimethylaminoethyl - 6H - dibenzo[c,e][1,2]thiazine-5,5-dioxide methiodide, M.P. 264–265° C. (with decomposition).

EXAMPLE 14

1 part of a 10% palladium on charcoal catalyst is added to a solution of 1.5 parts of 6 - β - (N-benzyl-N-isopropylamino)ethyl - 6H - dibenzo[c,e][1,2]thiazine - 5,5-dioxide in 50 parts of dioxan and the mixture is shaken with hydrogen at ambient temperature and atmospheric pressure until absorption of hydrogen is complete. The mixture is filtered and the filtrate is evaporated to dryness under reduced pressure. The residual oil is dissolved in ether, the solution is dried over sodium sulphate and filtered, and the filtrate is treated with excess of an ethereal solution of oxalic acid. The mixture is filtered and the solid residue is crystallised from methanol. There is thus obtained 6 - β - isopropylaminoethyl - 6H - dibenzo[c,e][1,2]thiazine - 5,5 - dioxide oxalate, M.P. 218° C. (with decomposition).

The 6 - β - (N - benzyl - N - isopropylamino)ethyl-6H-dibenzo[c,e][1,2]-thiazine-5,5-dioxide used as starting material in the above process may be obtained as follows:

A mixture of 5 parts of 6 - β - bromoethyl - 6H - dibenzo[c,e][1,2]thiazine-5,5-dioxide, 20 parts of dimethylformamide and 10 parts of N-benzylisopropylamine is heated at 90–100° C. for 24 hours. The dimethylformamide is removed by evaporation under reduced pressure and the residue is washed with water, then with petroleum ether (B.P. 60–80° C.) and filtered. The solid residue is crystallised from ethanol and there is thus obtained 6-β-(N - benzyl - N - isopropylamino)ethyl - 6H - dibenzo[c,e][1,2]thiazine-5,5-dioxide, M.P. 109–110° C.

EXAMPLE 15

0.5 part of platinum oxide catalyst is added to a solution of 1 part of 6 - β - aminoethyl - 6H - dibenzo[c,e][1,2]thiazine-5,5-dioxide in 50 parts of acetone and the mixture is shaken with hydrogen at ambient temperature and atmospheric pressure for 4 hours. The mixture is filtered and the filtrate is evaporated to dryness under reduced pressure. The residue is dissolved in ether and the solution is dried over sodium sulphate, filtered, and an excess of an ethereal solution of oxalic acid is added. The mixture is filtered and the solid residue is crystallised from methanol. There is thus obtained 6-β-isopropylamino - ethyl - 6H - dibenzo[c,e][1,2]thiazine - 5,5 - dioxide oxalate, M.P. 218° C. (with decomposition).

EXAMPLE 16

3 parts of 6 - cyanomethyl - 6H - dibenzo[c,e][1,2]thiazine-5,5-dioxide are added gradually to a stirred mixture of 1 part of lithium aluminum hydride in 50 parts of dry dimethoxyethane which is maintained at a temperature of −30° C. The temperature of the mixture is allowed to rise to 0° C. and the mixture is stirred at this temperature for 1 hour. Water is added dropwise to the stirred mixture at 0° C. in order to decompose the excess hydride, and the mixture is stirred for 1 hour at ambient temperature and then extracted with ether. The ethereal solution is dried over sodium sulphate and filtered and the filtrate is treated with an ethereal solution of oxalic acid. The mixture is filtered and the solid residue is washed with acetone. There is thus obtained 6-β-aminoethyl-6H-dibenzo[c,e][1,2]thiazine-5,5-dioxide oxalate. M.P. 212–213° C. (with decomposition).

The 6 - cyanomethyl - 6H - dibenzo[c,e][1,2]thiazine-5,5-dioxide used as starting material in the above process may be obtained as follows:

One part of a 50% dispersion of sodium hydride in oil is added gradually to a stirred solution of 4.6 parts of 6H-dibenzo[c,e][1,2]thiazine-5,5-dioxide in 15 parts of dimethylformamide which is maintained at a temperature of less than 10° C. The mixture is stirred at 10–15° C. for 30 minutes, and 1.6 parts of chloroacetonitrile are then added gradually. The mixture is heated at 50° C. for 1 hour and is then poured into water. The mixture is filtered and the solid residue is crystallised from glacial acetic acid. There is thus obtained 6-cyanomethyl-6H-dibenzo[c,e][1,2]thiazine-5,5-dioxide, M.P. 125–126° C.

EXAMPLE 17

A solution of 7 parts of sodium nitrite in 75 parts of water is added gradually to a stirred mixture of 24 parts of N - (o - aminobenzenesulphonyl) - N - (β - diethylaminoethyl)aniline, 50 parts of glacial acetic acid and 75 parts of concentrated hydrochloric acid which is maintained at a temperature of between 15° and 20° C. The mixture is stirred for 30 minutes at 20° C., diluted with 125 parts of water and heated at 95–100° C. until no more nitrogen is evolved and an azo-dye is no longer obtained when a sample of the mixture is treated with an alkaline solution of β-naphthol. The mixture is cooled, made alkaline with aqueous sodium hydroxide solution and extracted with chloroform. The chloroform extract is washed with water, dried over sodium sulphate, filtered, and the solvent is removed by evaporation. The residue is crystallised from petroleum ether (B.P. 60–80° C.) and there is obtained 6 - β - diethylaminoethyl - 6H - dibenzo[c,e][1,2]thiazine-5,5-dioxide, M.P. 79–80° C.

The N - (o - aminobenzenesulphonyl) - N - (β - diethylaminoethyl)aniline used as starting material in the above process may be obtained as follows:

15 parts of o-aminobenzenesulphonaniline are dissolved in a solution of 1.4 parts of sodium in 150 parts of ethanol, and to this solution are added 9.1 parts of a 10% solution of β-diethylaminoethyl chloride in benzene. The mixture is stirred and heated under reflux for 4 hours, cooled, filtered and the filtrate is evaporated to dryness under reduced pressure. The residual oil is N-(o-aminobenzenesulphonyl) - N - (β - diethylaminoethyl)aniline which is used directly without purification.

EXAMPLE 18

A solution of 0.7 part sodium nitrite in 10 parts of water is added gradually to a solution of 2.5 parts of o-(N-benzenesulphonyl-N-β-diethylaminoethylamino)aniline in a mixture of 10 parts of glacial acetic acid and 10 parts of concentrated hydrochloric acid which is maintained at a temperature of 10° C. The mixture is diluted with 20 parts of water and heated at 95–100° C. until an azo-dye is no longer obtained when a sample of the mixture is treated with an alkaline solution of β-naphthol. The mixture is cooled, made alkaline with aqueous sodium hydroxide solution and extracted with ether. The ethereal solution is dried over sodium sulphate, filtered, and the solvent is removed by evaporation. The residue is chromatographed on a column of alumina using chloroform as eluant. The desired fraction of the eluate is evaporated to dryness and the residue is crystallised from petroleum ether (B.P. 60–80° C.). There is thus obtained 6-β-diethylaminoethyl - 6H - dibenzo[c,e][1,2]thiazine-5,5-dioxide, M.P. 79–80° C.

The o - (N - benzenesulphonyl-N-β-diethylaminoethylamino)aniline used as starting material in the above example may obtained as follows:

2.5 parts of o-benzenesulphonamidoaniline are dissolved in a solution of 0.23 part of sodium in 50 parts of ethanol, and to this solution are added 20 parts of 10% solution of β-diethylaminoethyl chloride in benzene. The mixture is stirred and heated under reflux for 2 hours, cooled, filtered and the filtrate is evaporated to dryness under reduced pressure. The residual oil is o-(N-benzenesulphonyl-N-β-diethylaminoethylamino)aniline which is used directly without purification.

EXAMPLE 19

A mixture of 8 parts of 6-β-succinimidoethyl-6H-dibenzo-[c,e][1,2]thiazine-5,5-dioxide and 40 parts of 10% aqueous potassium hydroxide solution is heated at 95–100° C. for 5 minutes. The clear solution is cooled and acidified with dilute aqueous hydrochloric acid and the solution is decanted from the precipitated gum. The gum is heated under reflux for 30 minutes with 20 parts of 20% aqueous hydrochloric acid, the mixture is cooled and filtered and the filtrate is made alkaline with aqueous ammonium hydroxide solution. The alkaline mixture is extracted with ether and the ethereal extract is washed with water, dried over sodium sulphate and filtered. The filtrate is treated with excess of an ethreal solution of oxalic acid and the mixture is filtered. The solid residue is washed with acetone and dried, and there is thus obtained 6-β-aminoethyl-6H-dibenzo[c,e][1,2]-thiazine-5,5-dioxide oxalate, M.P. 213° C. (with decomposition).

The 6 - β - succinimidoethyl-6H-dibenzo[c,e][1,2]thiazine-5,5-dioxide used as starting material in the above process may be obtained as follows:

1 part of sidium hydride os added gradually to a stirred solution of 2 parts of succinimide in 20 parts of dimethylformamide, the temperature being kept below 20° C. A solution of 7 parts of 6-β-bromoethyl-6H-dibenzo[c,e]-[1,2]thiazine-5,5-dioxide in 10 parts of dimethylformamide is added, and the mixture is heated at 50° C. for 30 minutes. The mixture is cooled and poured into water, and the resulting mixture is filtered. The solid residue is crystallised from glacial acetic acid and there is thus obtained 6 - β-succinimidoethyl-6H-dibenzo[c,e][1,2]thiazine-5,5-dioxide, M.P. 167–168° C.

EXAMPLE 20

The process described in Example 5 is repeated except that the 7-bromo-6H-dibenzo[c,e][1,2]thiazine-5,5-dioxide is replaced by an equivalent amount of 7-trifluoromethyl-6H-dibenzo[c,e][1,2]thiazine-5,5-dioxide. There is thus obtained 6-β-diethylaminoethyl-7-trifluoromethyl-6H-dibenzo[c,e][1,2]thiazine-5,5-dioxide, M.P. 99–100° C. (crystallised from petroleum ether B.P. 60–80° C.).

The 7 - trifluoromethyl-6H-dibenzo[c,e][1,2]thiazine-5,5-dioxide (M.P. 170–172° C.) used as starting material in the above process may be prepared in a similar manner to that described in Example 4 for the preparation of 7-chloro-6H-dibenzo[c,e][1,2]thiazine-5,5 - dioxide, except that o - aminobenzenesulphon-o-trifluoromethylanilide is used in place of o-aminobenzenesulphon-o-chloroanilide.

The o - aminobenzenesulphon-o-trifluoromethylanilide, M.P. 91–92° C. (crystallised from ethanol) may be obtained from o-nitrobenzenesulphon-o-trifluoromethylanilide, M.P. 131–132° C. (crystallised from isopropanol), which in turn may be obtained from o-nitrobenzenesulphonyl chloride and o-trifluoromethylaniline, by a similar series of steps to those described in Example 5 for the preparation of o-aminobenzenesulphon-o-bromoanilide.

EXAMPLE 21

The process described in Example 7 is repeated except that the aqueous ethylamine solution is replaced by an equivalent amount of allylamine. There is thus obtained 6 - β-allylaminoethyl-6H-dibenzo[c,e][1,2]thiazine-5,5-dioxide hydrochloride, M.P. 187–188° C. (crystallised from a mixture of methanol and ether).

The process described in Example 7 is repeated except that the aqueous ethylamine solution is replaced by an equivalent amount of n-propylamine. The unreacted n-propylamine and dimethylformamide are removed by evaporation under reduced pressure, the residue is stirred with water and the mixture is filtered. The solid residue is crystallised from a glacial acetic acid and there is thus obtained 6 - β-n-propylaminoethyl-6H-dibenzo[c,e][1,2]-thiazine-5,5-dioxide hydrobromide, M.P. 225–266° C.

EXAMPLE 22

The process described in Example 7 is repeated except that the alkaline ethereal extract is treated with an ethereal solution of benzoic acid in place of the ethereal solution of hydrogen chloride. There is thus obtained 6-β-ethylaminoethyl-6H-dibenzo[c,e][1,2]thiazine-5,5-dioxide benzoate, M.P. 160–162° C. (crystallised from methanol).

The process described above is repeated except that the ethereal solution of benzoic acid is replaced by an ethereal solution of maleic acid. There is thus obtained 6-β-ethylaminoethyl - 6H - dibenzo[c,e][1,2]thiazine-5,5-dioxide maleate, M.P. 149–151° C. (crystallised from methanol).

EXAMPLE 23

A mixture of 50 parts of 6-β-ethylaminoethyl-6H-dibenzo[c,e][1,2]thiazine-5,5-dioxide hydrochloride and 25 parts of mannitol is filled into hard gelatin capsules. There are thus obtained capsules containing between 25 mg. and 500 mg. of active ingredient which are suitable for oral administration for therapeutic purposes.

The 6-β-ethylaminoethyl-6H-dibenzo[c,e][1,2]thiazine-5,5-dioxide hydrochloride used as active ingredient may be replaced by an equivalent quantity of 6-β-diethylaminoethyl-6H-dibenzo[c,e][1,2]thiazine-5,5-dioxide. 6 - β - dimethylaminoethyl-6H-dibenzo[c,e][1,2]thiazine-5,5 - dioxide. 6-γ-dimethylaminopropyl - 6H - dibenzo[c,e][1,2]thiazine-5,5-dioxide; 6-β - dimethylaminopropyl - 6H - dibenzo[c,e][1,2]thiazine-5,5-dioxide or 6 - β - aminoethyl-6H-dibenzo[c,e][1,2]thiazine-5,5-dioxide, and there are thus obtained in similar manner capsules containing between 25 mg. and 500 mg. of active ingredient which are suitable for oral administration for therapeutic purposes.

EXAMPLE 24

A mixture of 50 parts of 6-β-diethylaminoethyl-6H-dibenzo[c,e][1,2]thiazine-5,5-dioxide, 125 parts of maize starch, 270 parts of calcium phosphate and 1 part of magnesium stearate is compressed, and the compressed material is broken down into granules by passage through a 16-mesh screen. The granules so obtained are compressed into tablets containing between 25 mg. and 500 mg. of active ingredient, and there are thus obtained tablets which are suitable for oral administration for therapeutic purposes.

The active ingredient used in the above process may be replaced by an equivalent quantity of 6-β-dimethylaminoethyl-6H-dibenzo[c,e][1,2]thiazine-5,5-dioxide; 6 - γ - dimethylaminopropyl - 6H - dibenzo[c,e][1,2]thiazine-5,5-dioxide; 6 - β - dimethylaminopropyl-6H-dibenzo[c,e][1,2]thiazine-5,5-dioxide; 6-β-aminoethyl - 6H - dibenzo[c,e][1,2]thiazine-5,5-dioxide or 6 - β - ethylaminoethyl-6H-dibenzo[c,e][1,2]thiazine-5,5-dioxide hydrochloride, and there are thus obtained in similar manner tablets containing between 25 mg. and 500 mg. of active ingredient which are suitable for oral administration for therapeutic purposes.

What I claim is:

1. A dibenzothiazine derivative selected from compounds of the formula:

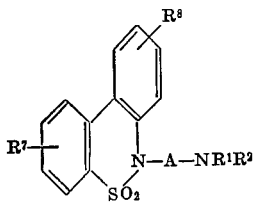

wherein A is straight- or branched-chain alkylene of 2 to 5 carbon atoms, wherein $R^1$ and $R^2$ are selected from hydrogen and alkyl, hydroxyalkyl and alkenyl each of up to 6 carbon atoms, and wherein $R^7$ and $R^8$ are selected from hydrogen, halogen, alkyl of up to 4 carbon atoms and trifluoromethyl, and the pharmacologically acceptable salts thereof.

2. A dibenzothiazine derivative, as claimed in claim 1, which has the formula given in claim 1 wherein A is straight or branched-chain alkylene of 2 to 5 carbon atoms, wherein $R^1$ and $R^2$ are selected from hydrogen, methyl, ethyl, n-propyl, isopropyl, butyl and β-hydroxyethyl, and wherein $R^7$ and $R^8$ are selected from chlorine, bromine, methyl and trifluoromethyl.

3. A dibenzothiazine derivative, as claimed in claim 1, which has the formula given in claim 1 wherein A is straight- or branched-chain alkyl of 2 to 4 carbon atoms, wherein $R^1$ and $R^2$ are selected from hydrogen, methyl and ethyl, and wherein $R^7$ and $R^8$ are hydrogen.

4. Salts as claimed in claim 1 which are selected from hydrochlorides, hydrobromides, sulphates, phosphates, acetates, oxalates, tartrates, citrates, benzoates, maleates, salicylates, methiodides and methosulphates.

5. A compound as claimed in claim 1 which is selected from
6-β-diethylaminoethyl-6H-dibenzo[c,e][1,2]thiazine-5,5-dioxide;
6-β-dimethylaminoethyl-6H-dibenzo[c,e][1,2]thiazine-5,5-dioxide and
6-γ-dimethylaminopropyl-6H-dibenzo[c,c][1,2]thiazine-5,5-dioxide and
the acid-addition salts therof.

6. A compound as claimed in claim 1 which is selected from
6-β-aminoethyl-6H-dibenzo[c,e][1,2]thiazine-5,5-dioxide;
6-β-dimethylaminopropyl-6H-dibenzo[c,e][1,2]thiazine-5,5-dioxide and
6-β-ethylaminoethyl-6H-dibenzo[c,e][1,2]thiazine,5,5-dioxide, and
the acid-addition salts thereof.

7. A compound as claimed in claim 1 which is selected from
7-chloro-6-β-diethylaminoethyl-6H-dibenzo[c,e][1,2]thiazine-5,5-dioxide;
2-chloro-6-γ-dimethylaminopropyl-6H-dibenzo[c,e][1,2]thiazine-5,5-dioxide;
6-β-di-isopropylaminoethyl-6H-dibenzo[c,e][1,2]thiazine-5,5-dioxide;
7-bromo-6-β-diethylaminoethyl-6H-dibenzo[c,e][1,2]thiazine-5,5-dioxide;
6-β-diethylaminoethyl-2-methyl-6H-dibenzo[c,e][1,2]thiazine-5,5-dioxide;
6-β-methylaminoethyl-6H-dibenzo[c,e][1,2]thiazine-5,5-dioxide;
6-β-(N-β-hydroxyethyl-N-methylamino)-6H-dibenzo[c,e][1,2]thiazine-5,5-dioxide;
6-β-n-butylaminoethyl-6H-dibenzo[c,e][1,2]thiazine-5,5-dioxide;
6-γ-methylaminopropyl-6H-dibenzo[c,e][1,2]thiazine-5,5-dioxide and
6-(4-dimethylaminobutyl)-6H-dibenzo[c,e][1,2]thiazine-5,5-dioxide, and
the acid-addition salts thereof.

8. A compound as claimed in claim 1 which is 6-β-dimethylaminoethyl-6H-dibenzo[c,e][1,2]thiazine-5,5-dixode methiodide.

9. A compound as claimed in claim 1 which is selected from
6-β-isopropylaminoethyl-6H-dibenzo[c,e][1,2]thiazine-5,5-dioxide;
6-β-n-propylaminoethyl-6H-dibenzo[c,e][1,2]thiazine-5,5-dioxide;
6-β-allylaminoethyl-6H-dibenzo[c,e][1,2]thiazine-5,5-dioxide and
6-β-diethylaminoethyl-7-trifluoromethyl-6H-dibenzo[c,e][1,2]thiazine-5,5-dioxide, and the acid-addition salts thereof.

References Cited
UNITED STATES PATENTS

| | | | |
|---|---|---|---|
| 3,198,793 | 8/1965 | Hilger et al. | 260—243 |
| 3,210,348 | 10/1965 | Rey-Bellet et al. | 260—243 |
| 3,285,911 | 11/1966 | Collins | 260—243 |

HENRY R. JILES, *Primary Examiner.*

J. M. FORD, *Assistant Examiner.*

U.S. Cl. X.R.

260—556; 424—246